United States Patent
Hsu et al.

(10) Patent No.: US 8,068,099 B2
(45) Date of Patent: Nov. 29, 2011

(54) MOBILE PHONE AND METHOD FOR CONTROLLING THE SAME

(75) Inventors: Hung-Young Hsu, Taipei (TW); Bo-Ching Chiou, Taipei (TW)

(73) Assignee: Wistron Corp., New Taipei (TW)

( * ) Notice: Subject to any disclaimer, the term of this patent is extended or adjusted under 35 U.S.C. 154(b) by 571 days.

(21) Appl. No.: 12/346,319

(22) Filed: Dec. 30, 2008

(65) Prior Publication Data
US 2009/0201264 A1 Aug. 13, 2009

(30) Foreign Application Priority Data
Feb. 12, 2008 (TW) .............................. 97104771 A

(51) Int. Cl.
*G06F 3/041* (2006.01)
(52) U.S. Cl. ........................................................ 345/173
(58) Field of Classification Search .................. None
See application file for complete search history.

(56) References Cited

U.S. PATENT DOCUMENTS

| 7,231,231 | B2 * | 6/2007 | Kokko et al. ................... 455/566 |
| 2005/0219222 | A1 * | 10/2005 | Johnson et al. ................ 345/173 |
| 2006/0029381 | A1 * | 2/2006 | Onozawa ....................... 396/147 |
| 2006/0135224 | A1 * | 6/2006 | Patino et al. ................. 455/575.3 |
| 2007/0032205 | A1 * | 2/2007 | Hamamura et al. .......... 455/90.1 |
| 2007/0072553 | A1 * | 3/2007 | Barbera ....................... 455/67.11 |
| 2008/0055263 | A1 * | 3/2008 | Lemay et al. ................. 345/173 |
| 2009/0201264 | A1 * | 8/2009 | Hsu et al. ..................... 345/173 |

* cited by examiner

*Primary Examiner* — Peter Vincent Agustin

(57) ABSTRACT

A mobile phone is provided. The mobile phone comprises a touch panel, a camera, and a processor. The touch panel comprises a touch-sensitive display screen, implementing a plurality of virtual buttons. The camera comprises a camera lens having a view-finding area in relation to the touch panel. The processor, respectively coupled with the touch panel and the camera, switches on the camera in response to receipt of a trigger signal, determines whether a focus of the camera for a subject is shorter than a preset distance, and if so, locks the touch panel.

21 Claims, 6 Drawing Sheets

MOBILE PHONE AND METHOD FOR CONTROLLING THE SAME

RELATED APPLICATIONS

Reference is hereby made to the Taiwan patent applications, Ser. No. 97104771, the disclosure of the application is incorporated herein by reference.

BACKGROUND

The invention relates to mobile phones, particularly to mobile phones with a touch panel and method for controlling the same.

This section is intended to introduce the reader to various aspects of art, which may be related to various aspects of the present invention, which are described and/or claimed below. This discussion is believed to be helpful in providing the reader with background information process to facilitate a better understanding of the various aspects of the present invention. Accordingly, it should be understood that these statements are to be read in this light, and not as admissions of prior art.

Mobile phones equipped with a touch panel have become popular. However, accidental triggering of functions has become troublesome for users. Specifically, because a receiver is generally positioned above the touch panel, when a user uses the receiver, the touch panel may be touched by the user's face, ear, fingers, or palm, thus accidentally triggering different functions. Additionally, only a few functions, such as 'back to the main menu', use hardware buttons, while a majority uses the touch panel.

The described problem becomes more serious for mobile phones with a capacitive touch panel. For a capacitive touch panel, conductive current is generated from capacitive changes caused between an electrode array and a surface of the human body. Accordingly, an operation can be triggered without force being applied on the touch panel. Thus, increasing the sensitivity of the touch panel and increasing the accidental triggering of functions for users.

For solving the described problem, a proximity sensor is used in mobile phones equipped with a touch panel. When the proximity sensor detects that a user is picking up the mobile phone and is using the receiver, the touch panel (screen) of the mobile phone automatically switches off, to avoid accidental triggering of functions. When the proximity sensor detects that the ear of the user has separated from the mobile phone earphone, the touch panel (screen) of the mobile phone automatically switches on, and returns to an active status. According to the conventional method, a proximity sensor is required. Thus, increasing manufacturing time and costs.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A mobile phone is provided. The mobile phone comprises a touch panel, a camera, and a processor. The touch panel comprises a touch-sensitive display screen, implementing a plurality of virtual buttons. The camera comprises a camera lens having a view-finding area in relation process to the touch panel. The processor, respectively coupled with the touch panel and the camera, switches on the camera in response to receipt of a trigger signal, determines whether a focus of the camera for a subject is shorter than a preset distance, and if so, locks the touch panel.

Also provided is a method for controlling a mobile phone. The mobile phone comprises a touch panel and a camera, wherein the touch panel comprises a touch-sensitive display screen implementing a plurality of virtual buttons, and the camera comprises a camera lens. A trigger signal has been received and the camera is accordingly switched on. It is determined whether a focal length of the camera for a subject is shorter than a preset focal length. When the focal length of the camera for the subject is shorter than a preset focal length, the touch pane is locked.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation process to another. Moreover, it should be appreciated that such a development effort might be complex and time consuming, but would nevertheless be a routine undertaking of design, fabrication, and manufacture for those of ordinary skill having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that the many of the elements described and illustrated throughout the specification are functional in nature and may be embodied in one or more physical entities or may take other forms beyond those described or depicted.

FIGS. 1A~1D are flowcharts of an embodiment of a method for controlling a mobile phone. The mobile phone comprises a touch panel and a camera, wherein the touch panel comprises a touch-sensitive display screen implementing a plurality of virtual buttons, and the camera comprises a front camera lens. Detailed description of the structure of the mobile phone is provided in FIG. 2.

Figure 1A:
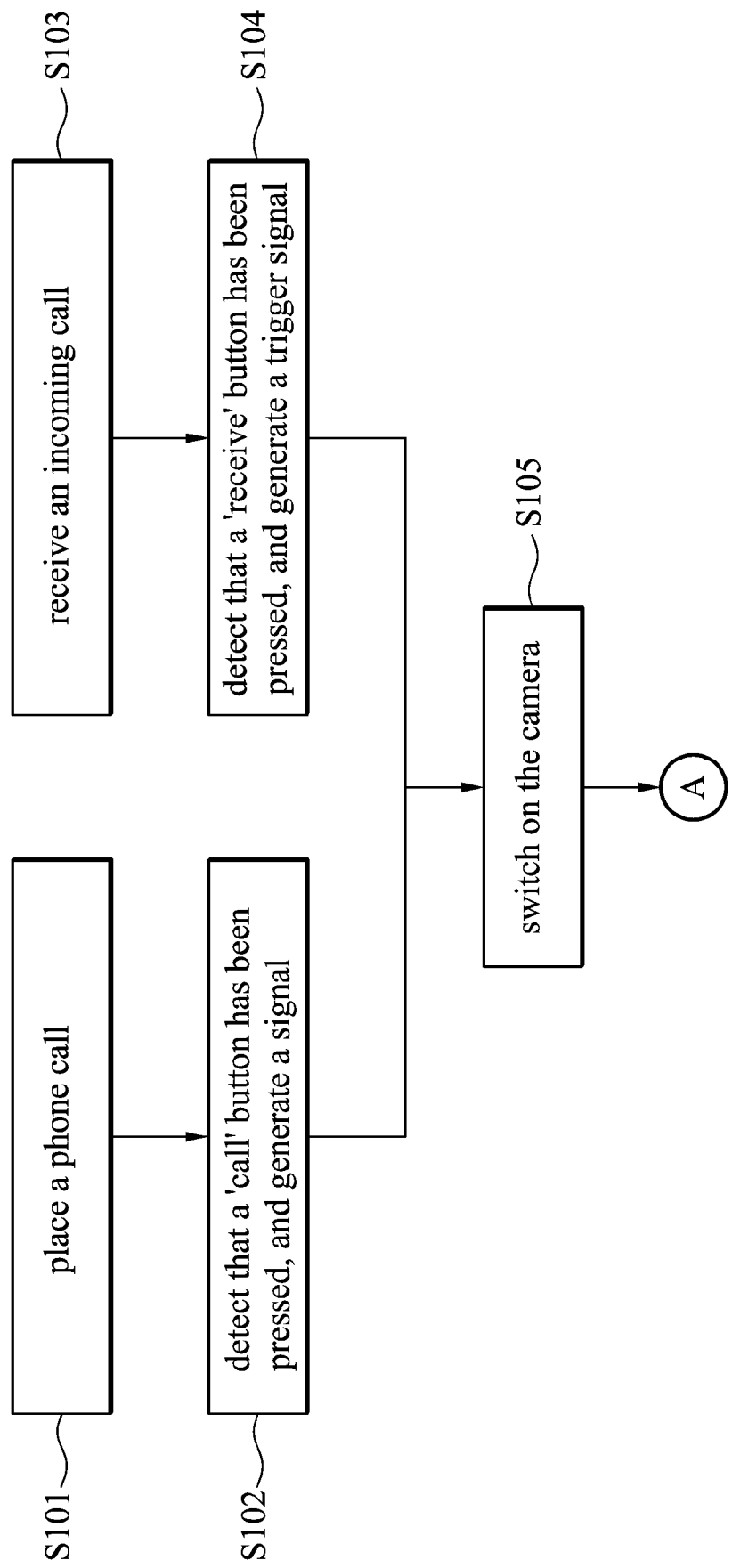
FIGS. 1A~1D are flowcharts of an embodiment of a method for controlling a mobile phone.

Referring to FIG. 1A, steps S101 and S102 represent a phone call being made. In step S101, a phone number input by a user has been received. In step S102, it is detected that a 'call' button has been pressed, and accordingly a signal is generated. The 'call' button can be a virtual button on the touch panel.

Steps S103 and S104 represent a phone call being answering. In step S103, an incoming call has been received. In step S104, it is detected that a 'receive' button has been pressed, and a trigger signal is accordingly generated. The 'receive' button can be a virtual button on the touch panel. In addition, the 'call' button and the 'receive' button can be implemented by the same virtual button.

In step S105, the camera with a front camera lens (hereinafter referred to as a front camera) has been switched on.

Figure 1B:
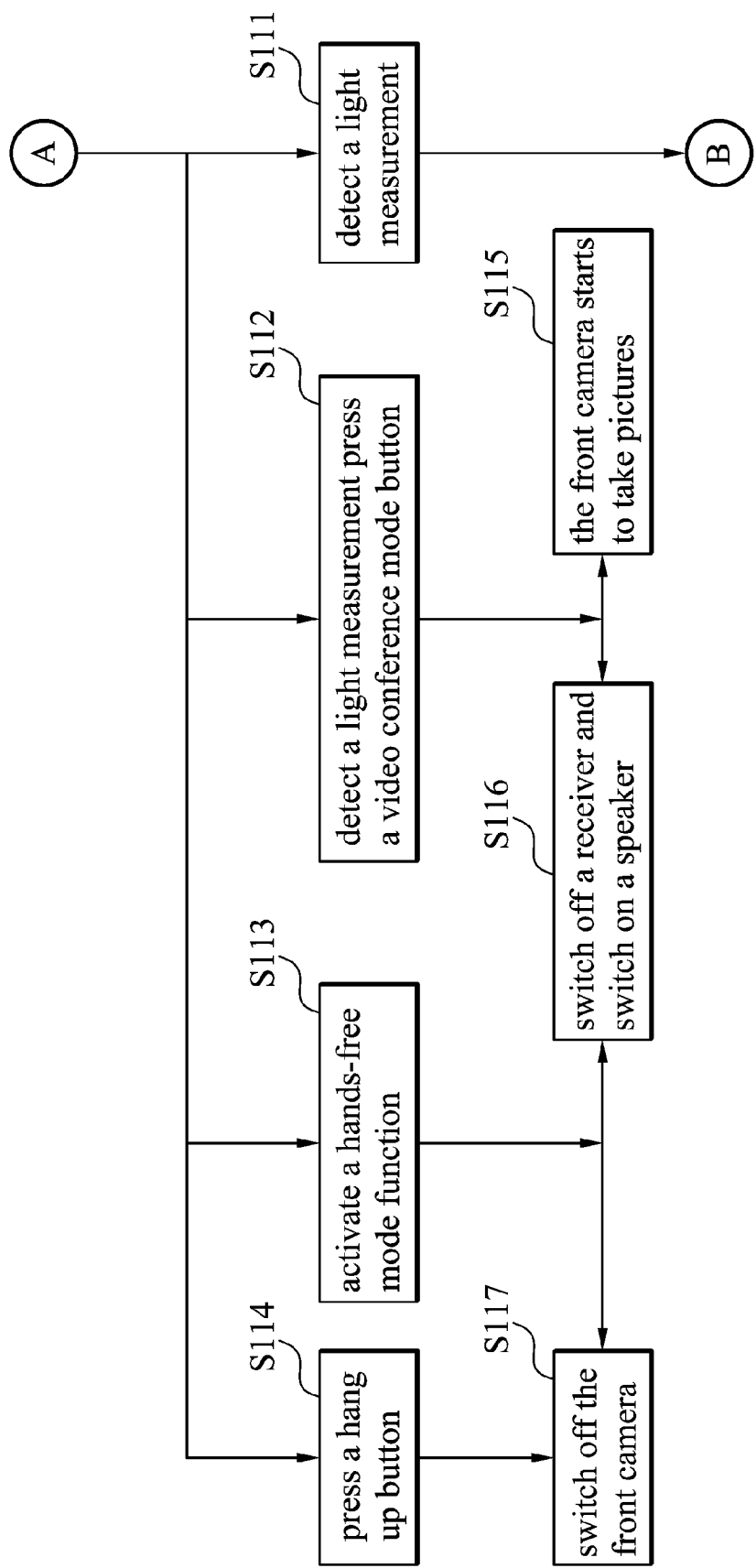

Referring to FIG. 1B, after the front camera has been switched on, the front camera has been switched off (step S117) once a hang up button has been pressed (step S114). The hang up button can be a virtual button on the touch panel.

After the front camera has been switched on, the front camera is switch off (step S117), a receiver has been switched off and a speaker has been switched on (step S116), when a hands-free mode function has been activated (step S113). The hands-free mode can be activated by pressing a virtual button (acting as a hands-free mode button) on the touch panel.

After the front camera has been switched on, the front camera starts to take pictures (step S115), the receiver has been switched off and the speaker has been switched on (step S116), when a video conference mode button has been pressed (step S112). The video conference mode button can be a virtual button on the touch panel.

If none of the buttons, such as the hang up button, the hands-free mode button, and the video conference mode button has been activated, the method proceeds to step S111, wherein a light measurement is detected.

Figure 1C:
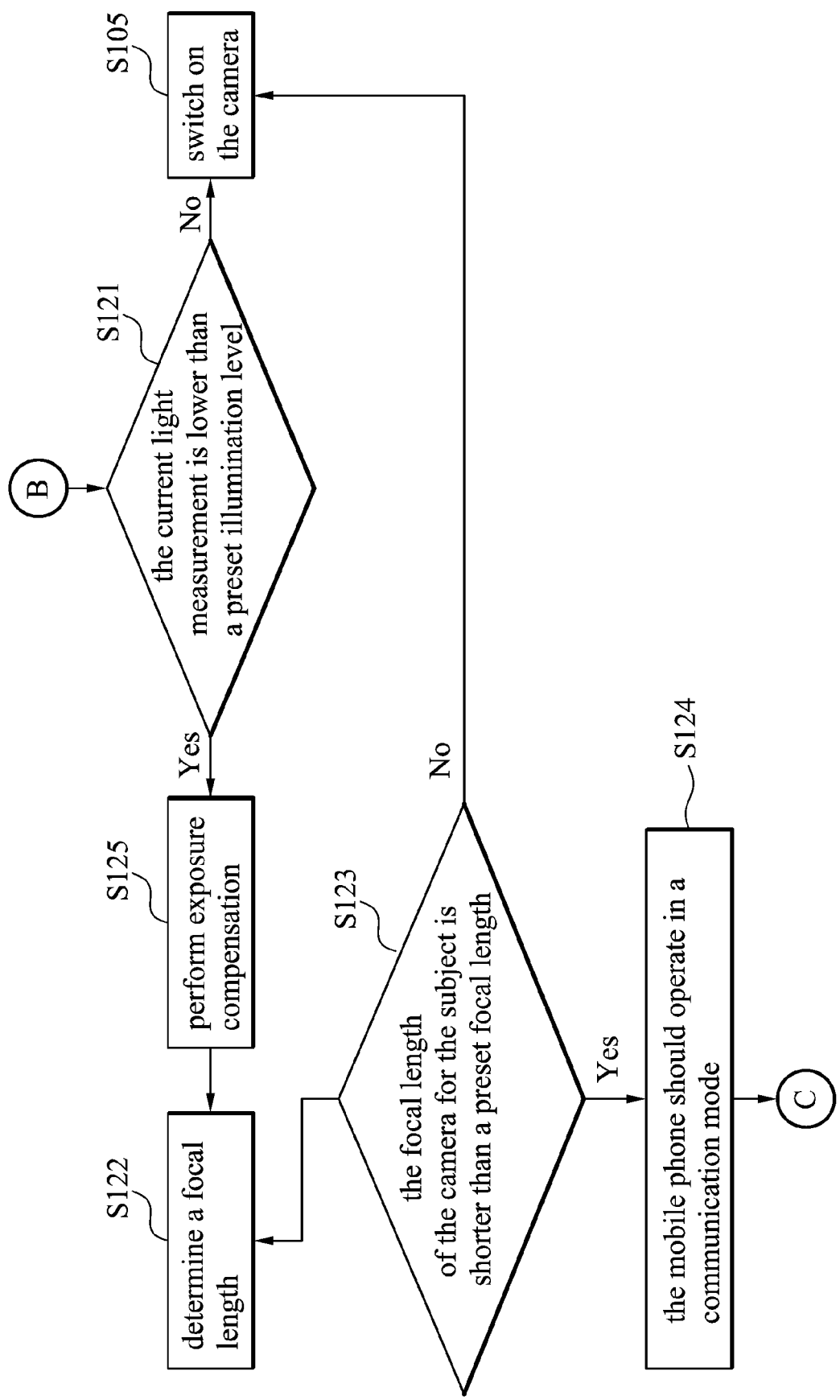

Referring to FIG. 1C, in step S121, it is determined whether the current light measurement is lower than a preset illumination level, and if so, the method proceeds to step S125, otherwise, the method returns to step S105.

In step S125, exposure compensation has been performed. The exposure compensation can be a software exposure compensation process to increase the exposure of the camera, or hardware exposure compensation process to provide more light by a flash or lamp. This procedure is used to avoid a situation in which the light is insufficient for determining a focal length (step S122).

In step S122, a focal length of the camera for a subject is determined.

In step S123, it is determined whether the focal length of the camera for the subject is shorter than a preset focal length, and if so, the method proceeds to step S124, otherwise, the method returns to step S105. The preset focal length is a minimum focal length for the camera. As described, the camera has a front camera lens, i.e., the camera lens and the touch panel face toward the same (roughly the same) direction (referred to as the 'front' direction). Accordingly, when the focal length of the subject is shorter then a certain focal length, it can be presumed that the subject is approaching the camera lens and the touch panel.

In step S124, it is determined that the mobile phone should operate in a communication mode. That is, it is determined that a user is making a call or answering a call when the 'receive' button (step S104) or the 'call' button (step S102) is pressed, and an object is approaching the touch panel.

Figure 1D:
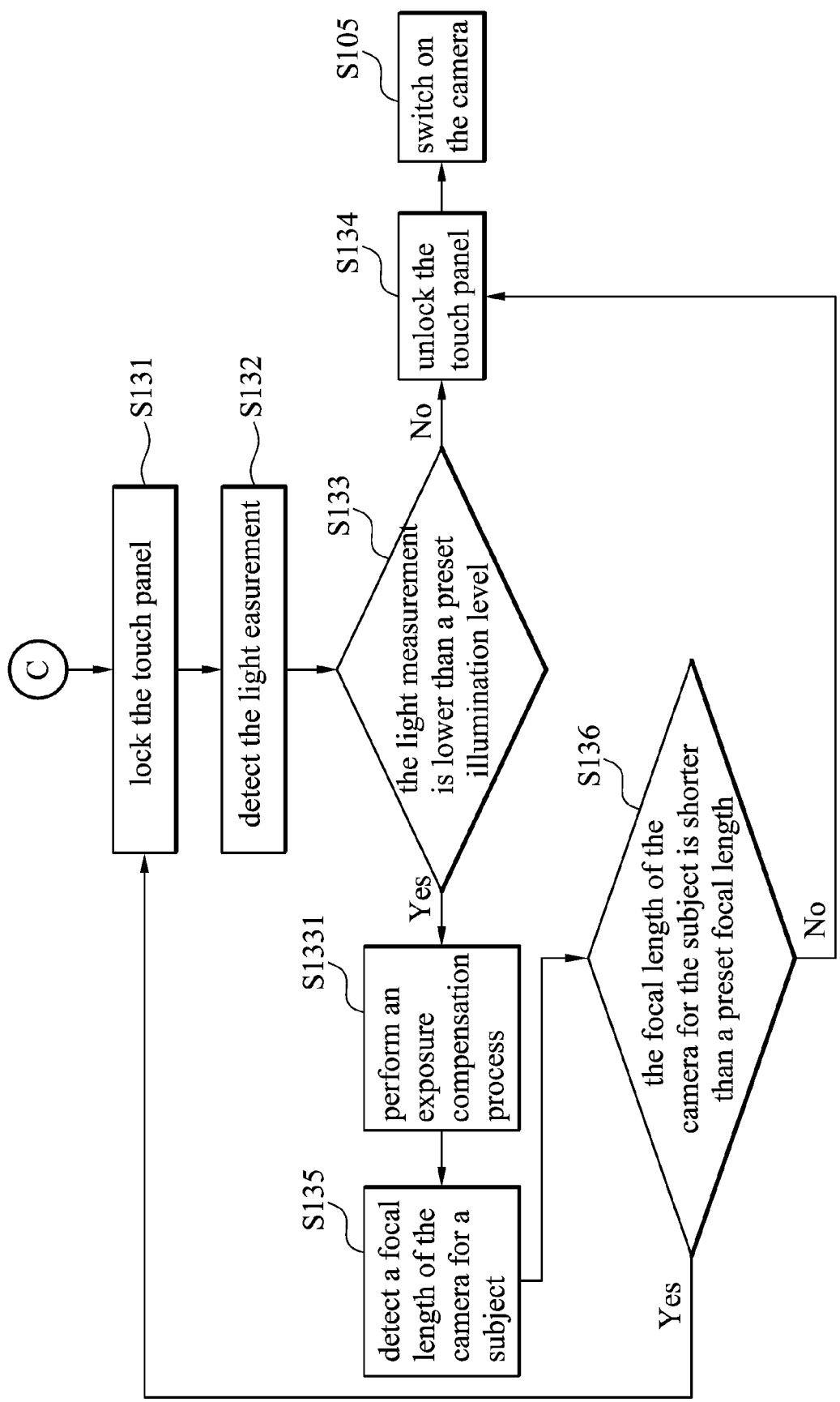

Referring to FIG. 1D, in step S131, the touch panel is locked. Thus, the virtual buttons on the touch panel cannot be activated to avoid accidental triggering of functions.

In step S132, the light measurement is determined when the touch panel has been locked. In step S133, it is determined whether the light measurement is lower than a preset illumination level.

Step S134 is performed when the light measurement is not lower than the preset illumination level; step S1331 is performed when the light measurement is lower than the preset illumination level. In step S1331, an exposure compensation process is performed. The exposure compensation process can be a software exposure compensation process to increase the exposure of the camera, or a hardware exposure compensation process to provide more light by a flash or lamp.

In step S134, the touch panel is unlocked. The method then returns to step S105.

In step S135, a focal length of the camera for a subject is determined. In step S136, it is determined whether the focal length of the camera for the subject is shorter than a preset focal length, and if so, the method proceeds to step S131, otherwise, the method returns to step S134. In step S131, the touch panel remains in a locked position. In step S134, the touch panel is unlocked.

Figure 2:
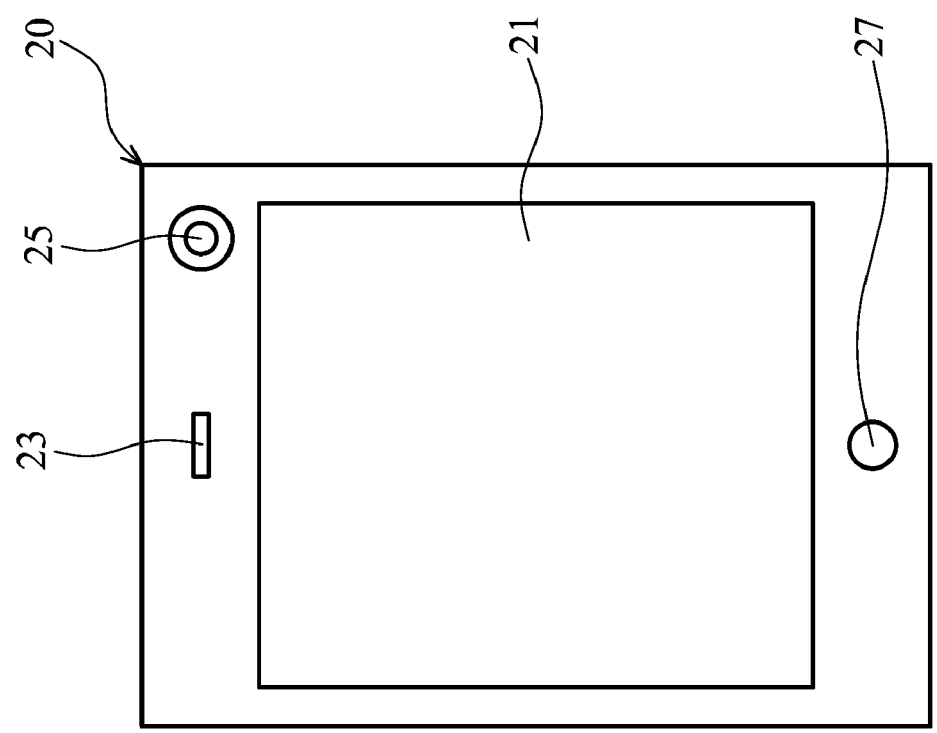
FIG. 2 illustrates an embodiment of a mobile phone.

FIG. 2 illustrates an embodiment of a mobile phone. Based on a front view, a mobile phone 20 comprises a touch panel 21, receiver 23, front camera 25, and hardware button 27.

The touch panel 21 comprises a touch-sensitive display screen implementing a plurality of virtual buttons.

The hardware button 27 implements functions such as 'back to the main menu', and other functions are implemented via the virtual buttons on the touch panel 21.

The receiver 23 is positioned above the touch panel 21. The front camera 25 is positioned on the upper-left or the upper-right of the touch panel 21 (upper-left in FIG. 2).

Because the mobile phone 20 has a large touch panel 21 and a receiver 23 is positioned above the touch panel 21, when a user uses the receiver, the touch panel 21 may be touched by the user's face, ear, and other parts of the body.

According to the method for FIGS. 1A~1D, when a user picks up the mobile phone 20 and begins a communication session, the touch panel 21 is automatically locked to avoid accidental triggering of functions.

Figure 3:
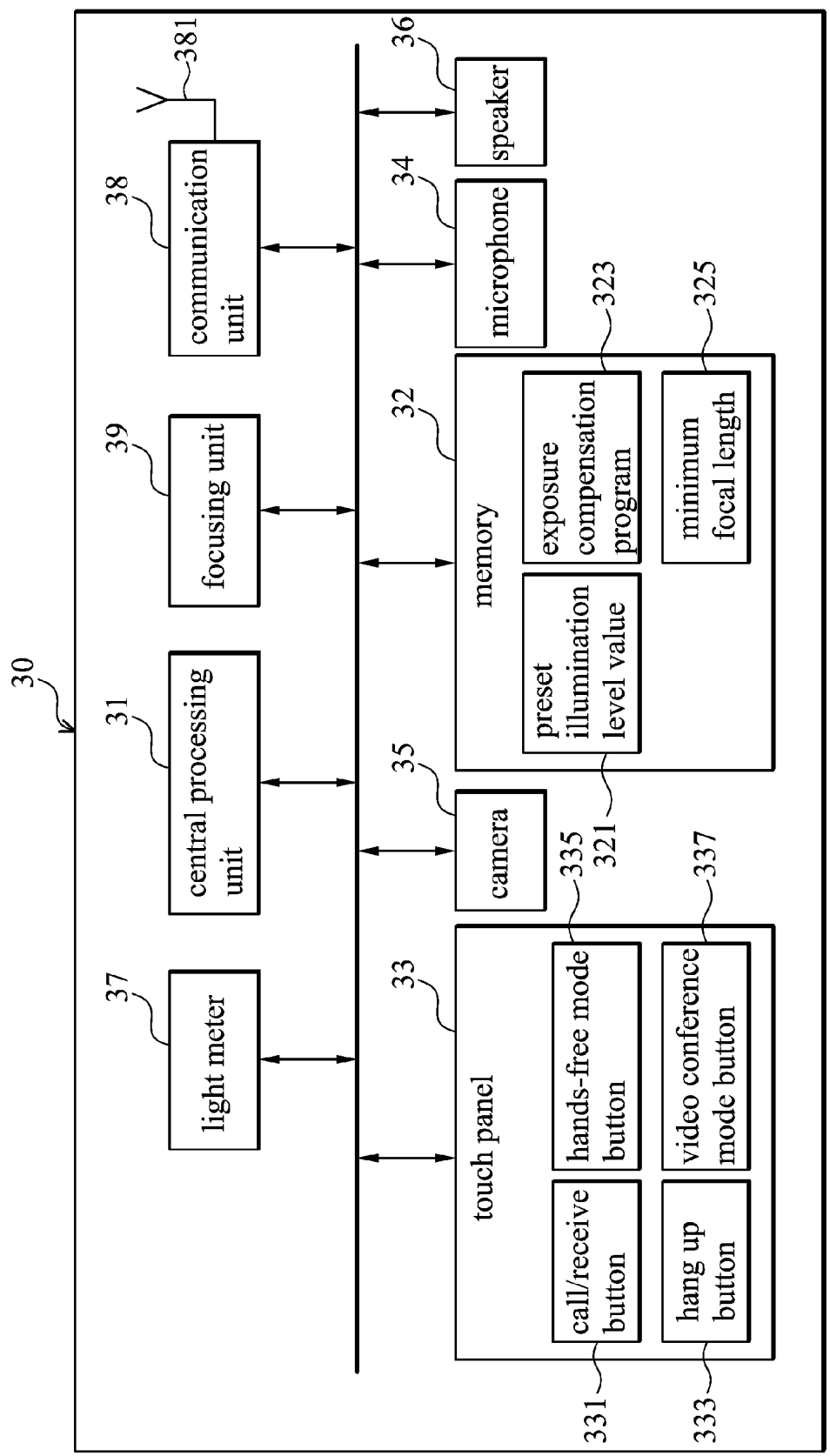
FIG. 3 illustrates a block diagram of an embodiment of a mobile phone.

FIG. 3 illustrates a block diagram of an embodiment of a mobile phone. A mobile phone 30 comprises a central processing unit 31, memory 32, touch panel 33, camera 35, light meter 37, focusing unit 39, microphone 34, speaker 36, and communication unit 38.

The memory 32 stores a preset illumination level value 321, an exposure compensation program 323, and a minimum focal length 325. In addition, the memory 32 stores operation programs, melody data, telephone numbers, and other data.

The touch panel 33 comprises a touch-sensitive display screen implementing a plurality of virtual buttons for receiving operation commands. For example, the virtual buttons on the touch panel 33 comprise: a call/receive button 331, a hang up button 333, a hands-free mode button 335, and a video conference mode button 337.

The camera 35 comprises a front camera lens. Here, the camera 35 is also referred to as a front camera. The camera 35 also has a flash or a lamp (not shown) for providing light.

The communication unit 38 connects to an antenna 381, and transmits and receives signals via the antenna 381.

The microphone 34 receives voice from a user.

The speaker 36 emits voice via a receiver or a speaker according to signals received by the communication unit 38.

The central processing unit 31 controls operation of the mobile phone 30 according to operation programs stored in memory 32.

The central processing unit 31 generates a trigger signal when a telephone number is input by a user and the call button has been pressed. In addition, the central processing unit 31 generates a trigger signal when an incoming call has been received and the receive button has been pressed.

The central processing unit 31 switches on the camera 35 in response to the trigger signal.

After the camera 35 has been switched on, the camera 35 will be switched off in two circumstances.

First, the central processing unit 31 switches off the camera 35 when the hang up button has been pressed. Second, the central processing unit 31 switches off the camera 35 and the receiver and switches on the speaker, when the hands-free mode button has been pressed.

In addition, the central processing unit 31 directs the camera 35 to start taking pictures, switches off the receiver, and switches on the speaker when the video conference mode button has been pressed.

The central processing unit 31 further directs the light meter 37 to determine a light measurement when none of the buttons, such as the hang up button, the hands-free mode button, and the video conference mode button has been activated. In addition, the central processing unit 31 determines whether the light measurement is lower than the preset illumination level value 321.

When the light measurement is not lower than the preset illumination level value 321, it can be presumed that no object is approaching the touch panel 33 (the light is not obstructed). Thus, the camera 35 keeps on taking pictures and the light meter 37 periodically monitors illumination levels.

When the light measurement is lower than the preset illumination level value 321, such as in a dark environment, it may be difficult to measure the focal length. To avoid this problem, the central processing unit 31 executes an exposure compensation program 323 to increase exposure value of the camera 35.

Meanwhile, the focusing unit 39 determines a focal length of the camera 35 for a subject. Next, the central processing unit 31 determines whether the focal length is shorter than a preset focal length (such as a minimum focal length 325).

When the focal length is not shorter than a minimum focal length 325, it can be presumed that there is no object positioned adjacent to the touch panel 33. Thus, the camera 35 keeps on taking pictures and the light meter 37 periodically monitors illumination levels.

When the focal length is shorter than a minimum focal length 325, the central processing unit 31 determines that the mobile phone is operating in a communication mode. That is, it is determined that a user is making a call or answering a call when the 'receive' button or the 'call' button has been pressed, and an object is approaching the touch panel.

In this situation, the central processing unit 31 locks the touch panel 33. The virtual buttons on the touch panel 33 are therefore deactivated to avoid accidental triggering of functions.

During the locked status of the touch panel, the light measurement is periodically determined by the light meter 37. Thus, the touch panel 33 can be automatically unlocked in response to an end of a communication session. The central processing unit 31 determines whether the light measurement is lower than the preset illumination level value 321. When the light measurement is not lower than the preset illumination level value 321, it can be presumed that the object (such as the user's face) has separated from the touch panel 33, and the touch panel 33 is unlocked. When the light measurement is lower than the preset illumination level value 321, the focusing unit 39 determines a focal length of the camera 35 for a subject, and the central processing unit 31 then determines whether the focal length is shorter than a preset focal length. If the focal length is shorter than a preset focal length, the central processing unit 31 locks the touch panel 33, otherwise, the central processing unit 31 unlocks the touch panel 33.

As described, using the embodiments of the invention, when a user picks up a mobile phone and uses the receiver, the touch panel of the mobile phone is automatically locked to avoid accidental triggering of functions.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone, comprising:
   a touch panel, comprising a touch-sensitive display screen implementing a plurality of virtual buttons;
   a camera comprising a camera lens; and
   a processor, respectively coupled with the touch panel and the camera, switching on the camera in response to receipt of a trigger signal, determining whether a focal length of the camera for a subject is shorter than a preset focal length, and if so, locking the touch panel.

2. The mobile phone of claim 1, wherein the camera comprises a front camera lens.

3. The mobile phone of claim 2, wherein the preset focal length is a minimum focal length of the camera.

4. The mobile phone of claim 1, wherein the trigger signal is generated when the virtual buttons are activated.

5. The mobile phone of claim 4, wherein the virtual buttons comprise a hang up button and a hands-free mode button, the processor receives the trigger signal when the hang up button or the hands-free mode button is activated, and a receiver has been switched off and a speaker accordingly has been switched on.

6. The mobile phone of claim 5, wherein the camera is switched off when the hang up button or the hands-free mode button has been activated.

7. The mobile phone of claim 4, wherein the virtual buttons further comprises a video conference mode button, the processor receives the trigger signal when the video conference mode button is activated, and a receiver has been switched off and a speaker accordingly has been switched on.

8. The mobile phone of claim 7, wherein the camera starts to take pictures when the video conference mode button has been activated.

9. The mobile phone of claim 1, wherein when the illumination level measured by a light meter is insufficient, the processor further performs a software exposure compensation or a hardware exposure compensation process to allow more light in.

10. A method for controlling a mobile phone, wherein the mobile phone comprises a touch panel and a camera, and the touch panel comprises a touch-sensitive display screen implementing a plurality of virtual buttons, and the camera comprises a camera lens, comprising:
    receiving a trigger signal and accordingly switching on the camera;
    determining whether a focal length of the camera for a subject is shorter than a preset focal length; and when the focal length of the camera for the subject is shorter than a preset focal length, locking the touch panel.

11. The method for controlling a mobile phone of claim 10, wherein the virtual buttons comprise a hang up button, a hands-free mode button, or a video conference mode button.

12. The method for controlling a mobile phone of claim 11, further determining whether a light measurement is lower than a preset illumination level when none of the buttons, such as the hang up button, the hands-free mode button, and the video conference mode button has been activated.

13. The method for controlling a mobile phone of claim 12, further determining whether the focal length is longer than the preset focal length when the light measurement is lower than the preset illumination level.

14. The method for controlling a mobile phone of claim 13, further performing a software exposure compensation or a hardware exposure compensation process to allow more light in.

15. The method for controlling a mobile phone of claim 12, further switching on the camera when the light measurement is higher than the preset illumination level, or when the focal length is longer than the preset focal length.

16. The method for controlling a mobile phone of claim 13, wherein when the focal length is shorter than the preset focal length, further determining that the mobile phone is operating in a communication mode, and thus locking the touch panel.

17. The method for controlling a mobile phone of claim 16, further determining, periodically, whether the light measurement is lower than the preset illumination level when the touch panel is locked.

18. The method for controlling a mobile phone of claim 17, further determining whether the focal length is shorter than the preset focal length when it is detected that the light measurement is lower than the preset illumination level.

19. The method for controlling a mobile phone of claim 17, further unlocking the touch panel and switching on the camera when it is detected that the light measurement is higher than the preset illumination level.

20. The method for controlling a mobile phone of claim 18, further unlocking the touch panel and switching on the camera when the focal length is longer than the preset focal length.

21. The method for controlling a mobile phone of claim 18, further locking the touch panel when the focal length is shorter than the preset focal length.

* * * * *